United States Patent [19]

Sheridon

[11] 4,143,103

[45] Mar. 6, 1979

[54] METHOD OF MAKING A TWISTING BALL PANEL DISPLAY

[75] Inventor: Nicholas K. Sheridon, Saratoga, Calif.

[73] Assignee: Xerox Corporation, Stamford, Conn.

[21] Appl. No.: 683,436

[22] Filed: May 4, 1976

[51] Int. Cl.² ............................................. B29C 6/02
[52] U.S. Cl. .................................. 264/4; 264/7; 264/232; 264/343
[58] Field of Search ................ 264/1, 4, 232, 7, 343, 264/347, 109

[56] References Cited

U.S. PATENT DOCUMENTS

| | | | |
|---|---|---|---|
| 3,256,374 | 6/1966 | Suzuki | 264/343 |
| 3,616,101 | 10/1971 | Satchell | 264/4 |
| 3,928,099 | 12/1975 | Ohotsubo et al. | 264/343 |
| 3,928,230 | 12/1975 | Unsworth | 264/4 |
| 4,016,099 | 4/1977 | Wellman et al. | 264/4 |

Primary Examiner—Donald J. Arnold

[57] ABSTRACT

A method of making a display characterized by a plurality of particles which have an electrical anisotropy due to hemispherical surface coatings of different Zeta potential and their distribution in a volume of a dielectric liquid and which also have an optical anisotropy due to the hemispherical surface coatings having different optical characteristics. The particles are mixed with a light transparent liquid which is subsequently cured to form an elastomeric or rigid slab. Following curing of the liquid, the slab is emersed in a plasticizer (dielectric liquid) which is absorbed by the slab and which causes the slab to expand slightly. Expansion of the slab around the particles provides a plasticizer-filled cavity around each particle which cavities allow the particles to rotate to provide a display in accordance with their optical anisotropy but does not allow substantial translation of the particles.

5 Claims, 6 Drawing Figures

METHOD OF MAKING A TWISTING BALL PANEL DISPLAY

BACKGROUND OF THE INVENTION

Flat display panel devices continue to receive much attention since they provide distinct advantages over conventional cathode ray tubes which are now the standard visual display device. U.S. Pat. No. 3,612,758 sets forth those advantages and discloses a flat display panel employing migration of color pigment particles to form an image on a matrix addressable panel. Specifically, the patented display utilizes a suspension of colored particles maintained is a thin layer of dyed dielectric liquid, enclosed between two electrodes, one of which is transparent. Upon the application of a D.C. voltage of suitable polarity between the electrodes; colored particles will move through the liquid toward the transparent electrode and deposit on it. The liquid is dyed a contrasting color to the colored particles such that only when the particles are deposited on, or in very close proximity to, the transparent electrode will the particles be visible; otherwise the color of the display as viewed through the transparent electrode will be that of the dyed dielectric liquid.

The flat panel display of U.S. Pat. No. 3,612,758, has several problems associated therewith which are difficult to solve. One problem relates to the usage of a dyed liquid; the dye tends to be absorbed on the colored particles and the transparent electrode, diminishing the contrast and appearance of the display. Particle settling over a period of time (due to gravity), particle agglomeration and clamping together over a period of time, and particle adherence to the transparent electrode pose additional problems. Another problem is that the particles must move substantial distances during display operation, thereby causing the display to operate with relative slowness. Also, because D.C. fields are used, it is probable that electro-chemical changes will take place in the display over extended periods of time.

Recent literature has proposed magnetic particle displays in lieu of cathode ray tube displays in order to overcome the size limitations, high voltage and high power requirements of cathode ray tube displays. The model magnetic particle display proposed uses tiny particles each of which is a plastic magnet comprised of ferrite powder held together by a suitable binder. The particles are about 0.8 millimeters in diameter, black in one hemisphere and silvered (or otherwise light reflective) in the other hemisphere. A magnetic field generated by the four conductors nearest a desired image spot controls the orientation of the particles proximate that spot such that their orientation with respect to a viewer conveys optical images by scattering of ambient light. Because of the close proximity of the conductors to other image spots, there arises a problem of discrimination, that is, the ability to address a chosen image spot without addressing other proximate image spots. In order to prevent clustering of the magnetic particles, the particles are individually encapsulated with small amounts of clear liquid in small, thin walled transparent spherical shells. The encapsulated particles are then cemented onto a suitable substrate to form the display panel. The requirements of a magnetic field to provide particle orientation, individual encapsulation of the particles, individual attachment of the particles to a suitable substrate, and discrimination problems present serious drawbacks to utilization of magnetic particle displays of the type described. Also, magnetic particle displays of the type described have neither an effective built-in threshold behavior or an effective memory capability.

OBJECTS OF THE INVENTION

It is an object of the present invention to provide a novel method of making an imaging/display system.

It is a further object of the present invention to provide a method of making an imaging/display system wherein all image particles are encapsulated simultaneously.

SUMMARY OF THE INVENTION

A flat panel display can be provided by encapsulating optically anisotropic particles in a volume of solid transparent material. The optical anisotropy is provided by having a portion of the surface of each particle light reflective or otherwise colored and the other portion of the particle surface of a different color or light absorbancy. Each particle occupies a cavity within the solid transparent material which may be elastomeric or rigid, with the cavities being slightly larger than the size of the particles such that each particle has freedom to rotate or otherwise move slightly within its cavity. The volume of each cavity not occupied by an optically anisotropic particle is filled with a dielectric liquid. It is well known that when particles are dispersed in a dielectric liquid the particles aquire an electric charge related to the Zeta potential of their surface coating. Corresponding to the optical anisotropy of the particles of the proposed display, different surfaces of the particles present different Zeta potentials, with the result that the particles have an electrical anisotropy in addition to their optical anisotropy. Under the action of an addressing electric field, such as provided by a conventional matrix addressing scheme, selected ones of the optically and electrically anisotropic particles are made to rotate or otherwise shift their orientation within their cavities to provide a display by the selective absorbtion and reflection of ambient light. Since the particles need only rotate, not translate, to provide an image, much faster imaging response is achieved than with the display of U.S. Pat. No. 3,612,758. Also, the display can be addressed electrostatically which provides increased discrimination relative to displays using magnetic addressing or switching.

In accordance with the invention, the display can be made by thoroughly mixing the optically anisotropic particles, preferably spherical in shape, with an uncured, light transparent material, preferably an elastomer. Following heat curing of the elastomer-particle mixture, the cured elastomer-particle slab is placed in a plasticizer fluid, specifically a dielectric plasticizer, which fluid is absorbed by the elastomer thereby causing the elastomer material to swell and creating a spherical void or cavity around each of the optically anisotropic particles which do not substantially absorb the plasticizer fluid. These voids or cavities will be filled with the plasticizer fluid which will cause the particles to acquire an electric charge such that upon the application of an electric field across selected portions of the elastomer, the particles within those portions of the elastomer will rotate within their cavities to provide an image. This method has the advantage that confinement of the particles is achieved by handling the particles in mass not individually as proposed in the previously described magnetic particle displays.

DETAILED DESCRIPTION OF THE INVENTION

Figure 1:
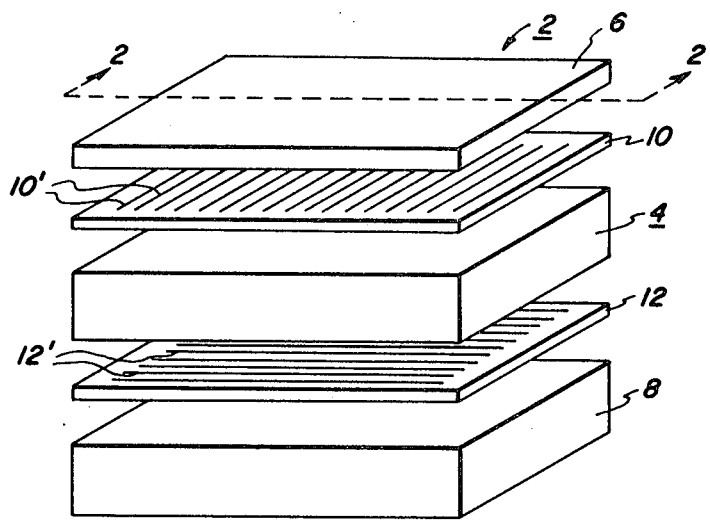
FIG. 1 is a perspective, exploded view of a display made in accordance with the invention.
Figure 2:
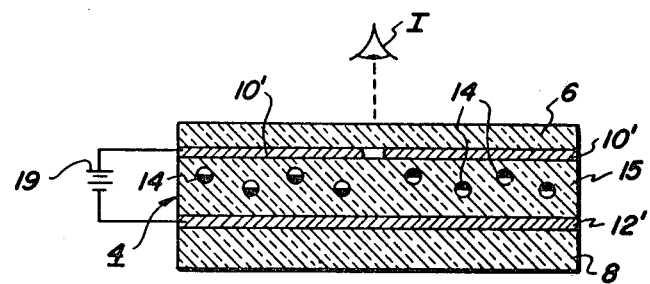
FIG. 2 is a sectional view of the display of FIG. 1 taken along line 2—2.

Referring to FIG. 1, reference character 2 designates, as a whole, a display which has a display panel 4 sandwiched between substrates 6 and 8. Intermediate the display panel 4 and substrate 6 is a first grid 10 of parallel electrical conductors 10'. A second grid 12, having parallel electrical conductors 12' oriented orthogonally relative to the conductors 10' of the first grid 10 is, provided between the substrate 8 and the display panel 4. At least one of the substrates 6 and 8 and at least the conductors of the grid adjacent that substrate are optically transparent so that ambient light can impinge upon the display panel 4 and so that the display provided by panel 4 can be viewed. As shown in FIG. 2, substrate 6 and conductors 10' are of optically transparent materials so that the ambient light incident upon the display will provide a visible image at I.

The display panel 4 includes a distribution of minute particles 14 which are optically anisotropic. The particles 14 are surrounded by a transparent dielectric fluid which, due to the optical anisotropy of the particles 14 and the difference in Zeta potential due to the coatings used to achieve that optical anisotropy, causes the particles 14 to have an electrical anisotropy. In addition to the particles 14 and the dielectric liquid which surrounds those particles, the panel 4 includes a solid, optically transparent support material 15 which permits the particles 14 to have the desired rotational freedom without having translational freedom.

Figure 2A:
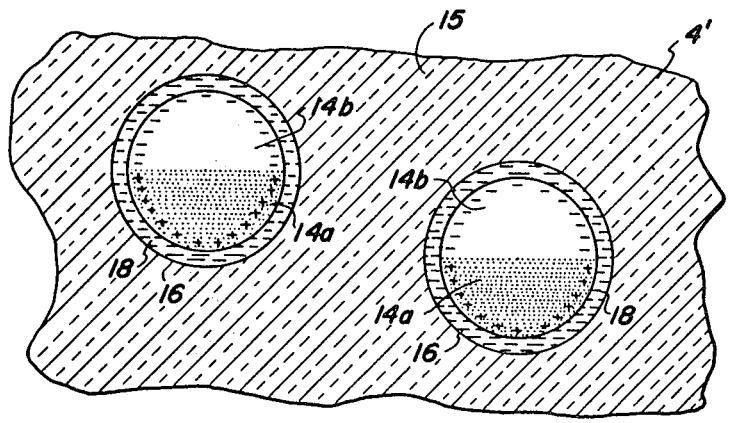
FIG. 2A illustrates an enlargement of a portion of the display of FIG. 1.

As shown in FIG. 2, the particles 14 of the panel 4 can be small spheres, typically 0.05 to 0.5 millimeters in diameter, which have hemispherical coatings of different Zeta potential. For example, as illustrated in FIG. 2a which shows a small, enlarged portion 4' of the panel 4, the difference in Zeta potential can be achieved by applying a coating to one hemisphere 14a of each of the spheres 14 that exhibits optical absorption characteristics, as illustrated by their dark shading, and by applying a coating to the other hemisphere 14b of each of the spheres 14 that exhibits light reflectance characteristics, as illustrated by the absence of dark shading. The difference between the light reflectance-light absorption characteristics of hemispheres 14a and 14b provides the desired optical anisotropy. Specifically, the spheres 14 could be comprised of black polyethylene with a light reflective material, for example, titanium oxide, sputtered on hemisphere 14b to provide the spheres 14 with the desired light reflective and light absorptive hemispheres. As shown in FIG. 2A, each of the spheres 14 is located within a cavity 16 of the transparent support material 15. Cavities 16 have a diameter slightly larger than the diameter of spheres 14 so that spheres 14 have the previously alluded to rotational freedom without translational freedom. Filling the voids between spheres 14 and cavities 16 is an optically transparent dielectric liquid 18.

Due to the difference in Zeta potential between the hemispheres 14a and 14b and the immersion of each of the spheres 14 in the dielectric liquid 18, the spheres 14 acquire an electrical charge, as shown symbolically in FIG. 2A where hemispheres 14a are more positive than hemispheres 14b. When a power source 19 is coupled across one of the electrodes 10' of the grid 10 and one of the electrodes 12' of the grid 12, as shown in FIG. 2, the positively charged hemisphere 14a will be attracted to the more negative electrode 12' and the spheres 14 within the field developed by the energized electrodes 10' and 12' will rotate, but without substantial translation, such that the light reflecting hemispheres 14b are oriented toward I. Thus, a light spot on a dark background is provided. By reversing the polarity of source 19, a black spot on a light background can be provided. By sequentially coupling the source 19 to selected of the crossover points of electrodes 10' and 12', as is done in conventional matrix addressing, an image is provided and viewable at I.

Figure 3A:
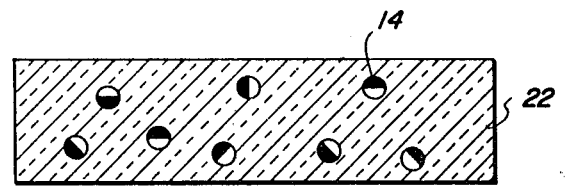
FIGS. 3A, 3B and 3C show a method in accordance with the invention of making the display of FIG. 1.
Figure 3B:
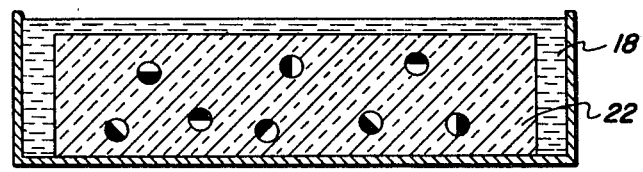

The panel 4 is formed by thoroughly mixing the optically anisotropic particles 14 with an uncured (liquid), optically transparent material, for example, an uncured elastomer such as Dow Corning Sylgard 182. The optically transparent material is then cured, such as in the case of Sylgard 182 by rapid heating to an elevated temperature of about 140 degrees Centigrade and maintaining the elastomer at that temperature for about 10 minutes, which provides the solid slab structure 22 shown in FIG. 3A in which the spheres 14 are in contact with slab 22 and thereby refrained from either rotational or translational movement. Following curing of the slab 22, the slab is placed in a dielectric liquid plasticizer 18 as shown in FIG. 3B, for a short period of time, typically over night, with the plasticizer at room temperature. For example, the dielectric liquid plasticizer 18 can be a silicon oil, such as Dow Corning 10 Centistoke 200 oil when the elastomer is Sylgard 182. Another satisfactory elastomer/plasticizer combination is Stauffer and Wacker V-53 elastomer with the above silicon oil.

Figure 3C:
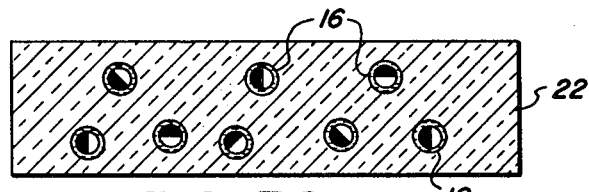

When the cured slab 22 is placed in the plasticizer 18, the plasticizer is believed to be absorbed by the slab material resulting in a swelling of the slab material. The spheres 14 are made of a material which does not readily absorb the plasticizer or absorbs the plasticizer at a substantially slower rate than the material of slab 22 absorbs the plasticizer, with the result that the swelling of the slab 22 creates voids (spherical cavities 16) around the spheres 14, as shown in FIG. 3C. The voids or cavities 16 are filled with the plasticizer and this structure allows easy rotation of the spheres 14, while permitting essentially no translation of spheres 14.

The slab 22 need not be an elastomer and in lieu thereof can be a rigid plastic such as polyethylene, polystyrene or plexiglass. Encapsulation can be achieved with the encapsulant molten or dissolved in a volatile solvent. An uncured rigid material such as an epoxy can be used as the encapsulant provided that it is light transparent. It is necessary that the material of slab 22 absorb the plasticizer more readily than do the spheres 14 in order that the cavities 16 may be formed. When the material of slab 22 is an elastomer, the spheres can be plastics such as polyethylene or polystyrene which do not absorb the plasticizer as readily as elastomers. When the material of slab 22 is a plastic, the spheres must be of a material which does not absorb the plasticizer, such as glass, or absorbs the plasticizer substantially less than the plastic.

The anisotropic spheres 14 should be coated with dielectric coatings. Black coatings may be obtained by the simultaneous evaporation of magnesium fluroide and aluminum in a vacuum chamber, whereas white coatings may be obtained by the slow deposition of indium.

The described encapsulating method can also be used to provide magnetic displays. In such displays, spherical balls are magnetized and given an optical anisotropy corresponding to their North and South poles. The balls will rotate in response to a proximate magnetic stylus.

What I claim is:

1. A method of making an optical display panel comprising the steps of:
   thoroughly mixing a plurality of solid, optically anisotropic particles with a non-solid material capable of being cured to a solid state to provide a mixture of said particles and said material,
   curing said mixture to solidify said material whereby said particles are trapped within a slab of said material, and
   dispersing said slab with said particles trapped therein into a bath of a dielectric plasticizer which is absorbed more readily by said solidified material than by said particles whereby said solidified material swells to create plasticizer-filled voids around said particles such that said particles can have rotational movement but substantially no translational movement within said slab.

2. The method of claim 1 wherein said material is an elastomer.

3. A method of making an optical display panel comprising the steps of:
   thoroughly mixing a plurality of solid, optically anisotropic particles with an uncured elastomer to provide a mixture of said particles and said elastomer,
   heat curing said mixture to solidify said elastomer whereby said particles are trapped within said elastomer, and
   dispersing said solidified elastomer with said particles trapped therein into a bath of a dielectric plasticizer which is absorbed more readily by said elastomer than by said particles whereby said elastomer swells to create plasticizer-filled voids around said particles such that said particles can have rotational movement but substantially no translational movement.

4. The method of claim 1 wherein a portion of the surface of each of said optically anisotropic particles are coated with a light reflective material, the remaining portion of said surface being coated with a light absorptive material.

5. The method as defined in claim 3 wherein a portion of the surface of each of said optically anisotropic particles are coated with a light reflective material, the remaining portion of said surface being coated with a light absorptive material.

* * * * *